Feb. 15, 1966  J. E. KILLPATRICK  3,234,843
HORIZON SCANNER
Filed April 6, 1961

INVENTOR.
JOSEPH E. KILLPATRICK
BY Charles J. Ungemach
ATTORNEY

United States Patent Office 3,234,843
Patented Feb. 15, 1966

3,234,843
HORIZON SCANNER
Joseph E. Killpatrick, Minneapolis, Minn., assignor to Honeywell Inc., a corporation of Delaware
Filed Apr. 6, 1961, Ser. No. 101,238
4 Claims. (Cl. 88—1)

This invention has to do with control apparatus and more particularly with apparatus for controlling or sensing the position of one body with respect to another without direct physical contact between them. The invention comprises an optical system mounted on one of the bodies for detecting radiant energy emitted by the other of the bodies as an indication of their relative orientation. The invention may be used wherever detection of the relative orientation of two bodies is needed and one of them can be made a source of radiant energy as, for example, visible or infrared energy either originating at the body or reflected therefrom. The invention may be used in a gyroscope to sense the position of the rotor without creating any friction or it may be used in space navigation to sense or control the position of a space vehicle with respect to a star or a planet. In the following specification the invention will be shown as used with an orbiting satellite to maintain some predetermined orientation of the satellite with respect to the earth. It should be understood however that the invention is not intended to be limited to such an application since a large number of useful applications of the teachings herein will occur to those skilled in the art.

In recent years it has become desirable to be able to detect the earth's horizon so that an orbiting satellite, for example, may be positioned accordingly. A number of devices have been proposed for detecting the earth's horizon by contrasting the infrared energy received from the earth with the lack of radiation from space. Such devices have normally required rotating mirrors or prisms which scan the horizon and detect the infrared energy therefrom. It has been found undesirable to have rotating parts in a satellite since extra weight and power consumption is usually necessary and since it is quite difficult to lubricate the necessary bearings in the almost total vacuum in space. The present invention overcomes these problems by eliminating all rotating parts and in the preferred embodiment of the invention there are no moving parts whatsoever.

One of the novel features which eliminates the need for rotating mirrors or prisms is the use of a reflecting surface of revolution such as a cone so positioned on the satellite that it receives and reflects energy from all parts of the earth's horizon simultaneously. The energy reflected from the cone, which may be visible light or infrared energy, is focused on a plane where it is found that an area is formed which receives no radiation. This "dark" area resembles an image of the earth but is in reality a representation of space beyond the earth's horizon.

To obtain a direct image of the earth is extremely difficult at relatively low altitudes since the earth then subtends a very large angle which cannot readily be acquired by present optical systems. Furthermore a large portion of the available energy is lost when attempts are made to acquire a direct image. The optical system of the present invention does not create a direct image of the earth but rather produces an anamorphosis of earth wherein radiation from the earth is focused so as to form an annulus representing earth around a "dark" area representing space. Thus instead of an image of earth surrounded by space the present invention provides a representation of space surrounded by earth. Nevertheless, the edge of the "dark" area is the dividing line between earth and space and can be utilized as an indication of the relative position of earth just as if a direct image of the earth's horizon were present. Radiation detectors may be placed near the edge of the "dark" area and if the satellite moves from the desired orientation the "dark" area will also move so as to change the radiation received by one or more of the detectors. Apparatus is then provided to utilize the change in detector output to cause reorientation of the satellite.

A more complete understanding of this invention will be gained upon examination of the following specification, claims and drawings in which:

Figure 1:
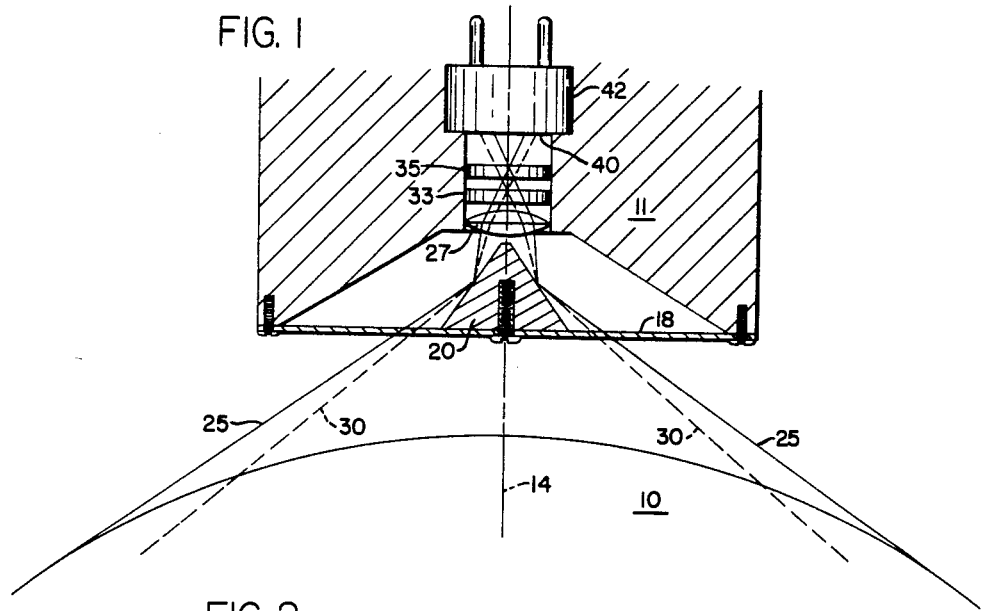
FIGURE 1 is a partially schematic representation of the optical system of the present invention.

Referring now to FIGURE 1, a source of energy such as the earth 10 and a portion of a body 11 which may be an orbiting satellite are shown. It may be desired to place the body 11 in a fixed attitude with respect to the earth as for example having it constantly assume a position along the local vertical. This local vertical is shown in FIGURE 1 as broken line 14.

Mounted by suitable supports such as bracket 18 to the body 11 is a cone-shaped member 20. The cone shaped member 20 is so positioned that its axis lies along the local vertical 14 when body 11 is in its desired orientation with its apex or top directed away from the earth. The sloping surface of cone 20 is polished so as to reflect any radiant energy emitted from the earth 10. For purposes of this invention, the earth may be considered as a plurality of point sources of infrared or visible energy. The apex angle of the cone is so chosen that energy from points at the earth's horizon may be reflected off the sloping surface at the maximum altitude the body is expected to attain. As shown in FIGURE 1, lines representing energy reflected from points on the earth's horizon have been numbered 25 and it is seen that these rays are reflected off the surface of cone 20 to a lens 27. Other lines representing radiant energy emitted at points on the earth inwards from the horizon have been shown as dashed lines 30 and these are also reflected off the surface of cone 20 to lens 27. Of course, depending on the size of the apex angle, a certain amount of energy radiated from the earth below will be blocked by the base of the cone and will not be reflected. It is sufficient that the energy from the horizon be reflected. Lens 27 is made relatively large and is placed relatively close to the apex of the cone 20 so as to receive as much of the reflected energy as possible. The energy reflected from cone 20 through lens 27 is then restricted to a predetermined radiation bandwidth by a spectral filter 33 and periodically interrupted by means of a chopper 35. The filter 33 is designed to discriminate between energy from the earth and energy from the sun. As will be seen, the sun may on occasion be seen by the optical system and in order to prevent malfunction of the detecting apparatus, filter 33 causes most of the energy from sun to be blocked. A filter designed to pass only the long wavelengths, for example, 10–25 microns, would block a principal part of the sun's radiation. Chopper 35 has been shown as a block which may be a semiconductor type light chopper such as germanium. Germanium when subjected to an alternating current becomes alternately opaque and transparent to infrared energy. The energy through the lens system is thus made pulsating for better utilization in the bridge circuit to be described. Alternately, of course a mechanical chopper such as a screen may be periodically moved to interrupt the energy flow and cause it to pulsate. At any rate, the pulsating energy then progresses to an image forming plane 40 of a detecting device 42 where it is focused. While the filter has been shown between lens 27 and the chopper 35, this arrangement of the optical system parts is arbitrary. The lens could be placed between the filter and the chopper or the chopper between the lens and the filter. The order is not important. Furthermore, the filter is only necessary to discriminate against the sun and could be eliminated if this were not a problem. Also, the chopper is used for purposes to be later described to overcome potential drifts, unbalances and other problems associated with D.C. bridges. If the amount of radiation available is large, the drift and associated problems may become negligible in which case the chopper would also be unnecessary.

Figure 2:
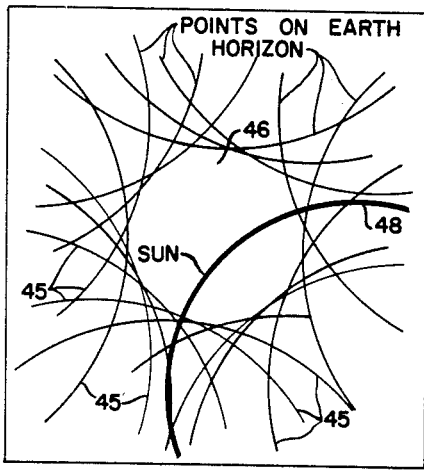
FIGURE 2 is a view of the focal plane showing the reflected images of a number of point sources of radiation.

Referring now to FIGURE 2 the plane 40 is shown upon which a number of point sources of energy on the earth's horizon are focused. It is noticed that each point source of light appears on plane 40 as a curve 45 bending somewhat away the center of the plane. This is accomplished by making the lens so as to focus at about the distance to the source of energy rather than on the reflecting cone. If the lens focused on the reflecting cone the source of energy would appear to be within the cone and a point source of energy would appear as a point except for spherical aberration. By focussing at substantially the distance to the source the energy is diffused by the cone and a point source of energy appears as a curve 45. In the preferred embodiment the earth is far enough away that the lens may be focused at infinity. It is further seen that curves 45 together begin to define an area in the center of plane 40 which receives no radiation. This "dark" portion has been given numeral 46 in the center of plane 40 and actually represents space beyond the earth's horizon. The combined effect of all of the curves is to define an area in this instance almost circular in which no radiation from earth is focused. The edge of this area represents the dividing line between earth and space and is thus a representation of the earth's horizon. A point source of light in space beyond the earth's horizon will appear as a curve passing through the "dark" area 46 as is shown in FIGURE 2 by curve 48 representing the image of the sun.

Referring now to FIGURE 3 plane 40 is again shown, this time more realistically since an infinite number of point sources of radiation exist around the earth's horizon. It is noticed that a well defined "dark" area is formed which is substantially circular when the body is correctly oriented and the image is centered. The intensity of radiation increases rapidly from the edge of the "dark" area 46 outwardly since the radiation inwards from the horizon adds to the energy already present in the focal plane from the horizon. A source of energy in space such as the sun is again shown as a curve 48 through the "dark" area 46.

Figure 3:
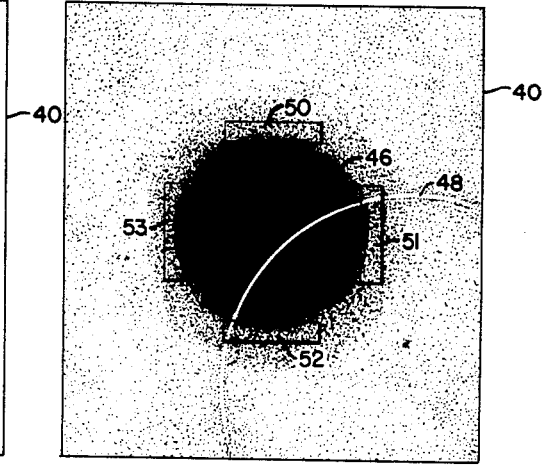
FIGURE 3 is a view of the focal plane showing the earth's horizon as it would normally appear.

As long as the "dark" area 46 is in the position shown in FIGURE 3 on plane 40, i.e. centered, the axis of cone 20 is along the local vertical and body 11 is in the desired orientation. If the body 11 changes position, the "dark" area moves away from the position shown.

In order to detect disorientation of body 11 all that is necessary is to detect movement of the "dark" area 46 which may be accomplished by means of suitable scanning apparatus or, as shown in FIGURE 3 by means of radiation detectors 50, 51, 52 and 53 equally spaced around the periphery of "dark" portion 46. Radiation detectors 50, 51, 52 and 53 may be of the thermistor bolometer type which change resistance in accordance with the intensity of radiation received. As shown in FIGURE 3 these bolometers are spaced near the edge of the "dark" portion 46 so that each is receiving equal radiation intensity. It is seen that as "dark" portion 46 moves in any way at least one of the bolometers will receive less radiation while the opposite bolometer will receive more. This will change the resistance of those two bolometers which change can be utilized by a bridge circuit to activate some motive means such as control rockets which will reorient body 11 until the "dark" portion 46 is again centered as shown in FIGURE 3.

Figure 4:
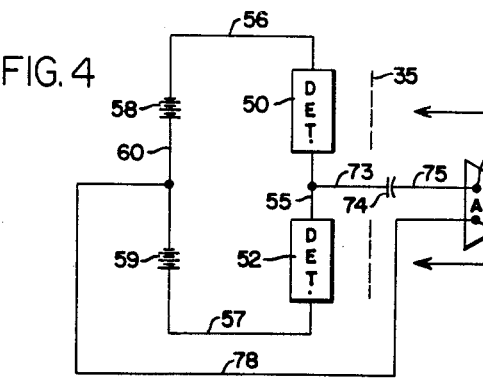
FIGURE 4 is a schematic representation of one of the control bridges of the present invention.

FIGURE 4 shows a bridge circuit which utilizes two of the oppositely spaced bolometers to detect motion of the "dark" spot along one axis. Another such bridge would be necessary to detect motion along the transverse axis. Bolometers 50 and 52 are connected in series by a conductor 55 and are supplied with D.C. energy through conductors 56 and 57 by means of batteries or other D.C. sources 58 and 59 connected in series by conductor 60. A phase sensitive amplifier 70 is shown with a pair of input terminals 71 and 72. Input terminal 71 is connected to conductor 55 by means of conductor 73, a capacitor 74 and conductor 75. Input terminal 72 is connected to conductor 60 by conductor 78. Assume for a moment that batteries 58 and 59 are equal and that bolometers 50 and 52 are matched so as to have equal resistance when receiving equal radiation. Under these conditions there would be no voltage between conductors 55 and 60 when equal radiation was received by bolometers 50 and 52. Furthermore, as the "dark" spot moved, bolometers 50 and 52 would change resistance so as to produce an output between conductors 55 and 60 of sense dependent upon the direction of movement of the "dark" spot. This would be true whether the radiation received by the bolometers were made pulsating by chopper 35 or not. However, if this energy is not chopped, the unbalance voltage between conductors 55 and 60 would be a constant D.C. and the bridge would not be able to detect whether the unbalance was caused by change in the resistance of bolometers 50 and 52, by a drift in the voltage supplied by batteries 58 or 59, or by drift in other parameters in the bridge or amplifier. Since drift is a common failing of D.C. sources, such a bridge would be useful only if the amount of available radiation was large so that unbalance signals due to drift would be small compared to unbalance signals due to changes in radiation received by the bolometers. When the amount of available radiation is small the difficulty is overcome and the sensitivity of the bridge is increased by pulsating the energy received by the bolometers as is done by chopper 35. Under these circumstances, D.C. unbalance signals caused by drift or the like may be blocked by a capacitor while pulsating unbalance signals due to changes in radiation are passed. Thus capacitor 74 is used in the preferred embodiment to block any direct current to amplifier 70 so that the only input to amplifier 70 is that due to the pulsating current caused by an unbalance in the radiation received by bolometers 50 and 52. The circuit is such that when the radiation received by bolometers 50 and 52 is equal this pulsating signal is nullified and there is no alternating output between conductors 55 and 60. If the "dark" area 46 moves, one or the other of bolometers 50, 52 receives more radiation, the pulsating signal from these bolometers is no longer canceled and an alternating output signal from the bridge appears between conductors 55 and 60 to be presented to the input of amplifier 70. This input signal would have a phase depending on which direction the dark spot moved and a corresponding signal would appear in the output of a phase sensitive amplifier 70. The output of amplifier 70 is connected by a cable 79 to an attitude control mechanism 80 which is operable to cause a predetermined motive means such as a rocket to fire and re-establish the desired orientation of body 11 with respect to the earth.

At this point it should be noted that an A.C. bridge could also be used by properly distinguishing between the alternating supply frequency and the pulsating chopper frequency with suitable filters. In fact, where large amounts of radiation are available and chopper 35 becomes unnecessary an A.C. bridge may be preferable.

The sun's image shown in FIGURE 3 may occasionally fall on one or more of the bolometers thereby changing the amount of radiation received and producing an unbalance signal. However, this error is negligibly small because most of the sun's energy is blocked by filter 33 and because the curve produced by the sun is very narrow and disbursed by the optical system.

It is thus seen that the present invention utilizing infrared energy from the earth creates a representation of the horizon which may be used to control a satellite in orbit. It should be understood that other applications of the teachings herein are numerous. For example, visible energy from the earth could be used in which case, a complete almost circular "dark" area would not normally be present since part of the earth would be in darkness. However energy would normally be received from at least one half of the horizon and the image formed would have at least a semi-circular "dark" portion which also defines the horizon. Furthermore, instead of concentrating on the energy from earth, the star background can be used to define the horizon. In this case, the energy from the stars would provide a plurality of curves through the dark areas but no stars would be visible behind the earth. Then the horizon of the earth would be defined by determining the smallest circle that includes all of the star curves. Clearly one skilled in the art will find many modifications of the present invention and I therefore do not wish to be limited by the specific disclosures used in connection with the preferred embodiment but intend only to be limited by the appended claims.

I claim:

1. Apparatus of the class described comprising, in combination: a conical reflecting surface having an axis of symmetry; and an optical system concentrically positioned on said axis including a lens, a chopper, a filter, and detecting means positioned at the principal focus of said lens to filter, chop and focus substantially all of the energy reflected from said surface onto the detecting means, each ray of energy being focused as an arc on said detecting means so as to form a homogeneous image thereon.

2. An optical system comprising a conical reflecting surface with an axis of symmetry, a lens centered on said axis and a detector positioned on said axis at the principal focus of the lens so that a point source of energy is reflected from said surface and focused by said lens as an arc on said detector, the system responding to a plurality of point sources of energy to define an image on said detector which is a composite of overlapping arcs each representing one of said point sources of energy.

3. Apparatus for use with a plurality of point sources of energy which together define the periphery of a body the position of which is to be detected comprising, in combination: a conical member having an energy reflecting surface, an axis of symmetry, a first portion of relatively large cross section and a second portion of relatively small cross section; means mounting said member with its first portion towards the body and arranged so that the point sources of energy lie outside an infinite extension of the reflecting surface; detecting means positioned on said axis; and a lens mounted on said axis proximate to the second portion and focused on the point sources of energy, the reflecting surface receiving and reflecting rays of energy from each point source of energy and said lens receiving and focusing the reflected rays to produce an anamorphosis wherein each point source of energy is represented by a curve on said detecting means and the composite of the overlapping curves thus represented defines a representation of the periphery of the body on said detecting means which representation so defined is indicative of the position of the body.

4. Apparatus for detecting the relative orientation of a first body with respect to a second body, the second body being defined by a plurality of point sources of energy, comprising, in combination: a conical reflecting surface having an axis of symmetry mounted on the first body to reflect energy from said point sources; and focusing means centered on said axis and focused on said point sources and operable to receive the energy reflected from the conical surface to create an anamorphosis of said point sources in an image receiving plane, the anamorphosis comprising a plurality of overlapping curves, one for each point source of energy, which curves together define the periphery of the second body.

References Cited by the Examiner

UNITED STATES PATENTS

| | | | |
|---|---|---|---|
| 1,626,787 | 5/1927 | Corlett | 88—16 |
| 2,176,554 | 10/1939 | Hardy | 88—57 |
| 2,198,014 | 4/1940 | Ott | 88—57 |
| 2,244,235 | 6/1941 | Ayres | 88—57 |
| 2,737,864 | 3/1956 | Gutterman et al. | 88—14 |
| 2,941,081 | 6/1960 | Greenlee et al. | |
| 2,952,779 | 9/1960 | Talley | 250—203 |
| 3,023,315 | 2/1962 | Muskat | 250—203 |
| 3,121,165 | 2/1964 | Astheimer et al. | 250—203 |

FOREIGN PATENTS

| | | |
|---|---|---|
| 704,471 | 2/1931 | France. |
| 1,200,781 | 7/1959 | France. |

JEWELL H. PEDERSEN, *Primary Examiner.*

WILLIAM MISIEK, *Examiner.*